(12) United States Patent
Lauchner

(10) Patent No.: US 6,832,869 B2
(45) Date of Patent: Dec. 21, 2004

(54) HOOKED SHAFT FASTENING DEVICE

(75) Inventor: Craig Lauchner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 10/236,491

(22) Filed: Sep. 5, 2002

(65) Prior Publication Data

US 2004/0047707 A1 Mar. 11, 2004

(51) Int. Cl.[7] .............................. F16B 1/00; F16B 39/00; F16B 35/04
(52) U.S. Cl. ........................ 403/204; 411/184; 411/204; 411/208
(58) Field of Search .......................... 411/82, 166, 184, 411/185, 186, 187, 418, 521, 380, 258, 342, 345, 400, 930, 208, 204, 420, 959, 209; 403/13, 22, 408.1, 204

(56) References Cited

U.S. PATENT DOCUMENTS

| | | | | |
|---|---|---|---|---|
| 1,955,353 A | * | 4/1934 | Wiley | 411/400 |
| 2,578,515 A | * | 12/1951 | Crafton | 411/340 |
| 3,295,580 A | * | 1/1967 | Waltermire | 411/187 |
| 3,456,547 A | * | 7/1969 | Strong | 411/105 |
| 3,922,946 A | * | 12/1975 | Grayson | 411/385 |
| 4,722,648 A | * | 2/1988 | Camilleri | 411/340 |
| 5,112,155 A | * | 5/1992 | Jackson | 411/340 |
| 5,865,559 A | * | 2/1999 | Yang | 411/340 |
| 5,904,462 A | * | 5/1999 | Gonzalez | 411/342 |
| 6,098,775 A | * | 8/2000 | Chojecki | 411/107 |
| 6,193,261 B1 | * | 2/2001 | Hahka | 411/345 |
| 6,494,653 B2 | * | 12/2002 | Remmers | 411/344 |
| 6,619,898 B1 | * | 9/2003 | Cosenza | 411/353 |

FOREIGN PATENT DOCUMENTS

EP 0 310 775 A1 * 4/1989

* cited by examiner

Primary Examiner—Robert J. Sandy

(57) ABSTRACT

A fastening device is disclosed, which has a slotted shaft, a hooking mechanism coupled to the shaft and adapted to couple the shaft to a supporting structure. The hooking mechanism deploys to an operational position from the end of the slotted shaft and is adapted to couple the slotted shaft to a supporting structure. A tightening mechanism is adapted to couple to the shaft. The tightening mechanism binds the fastening device securely in place.

12 Claims, 10 Drawing Sheets

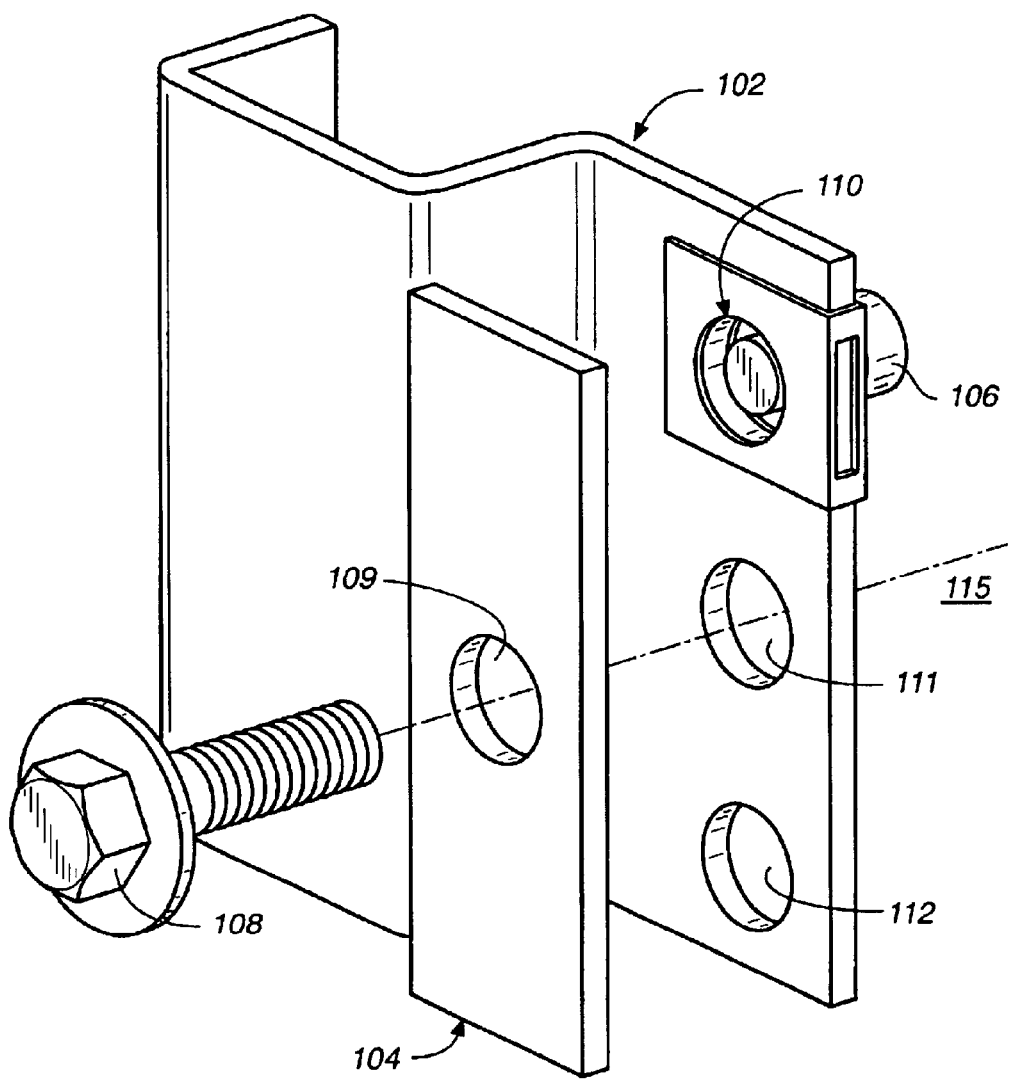
FIG._1
*(PRIOR ART)*

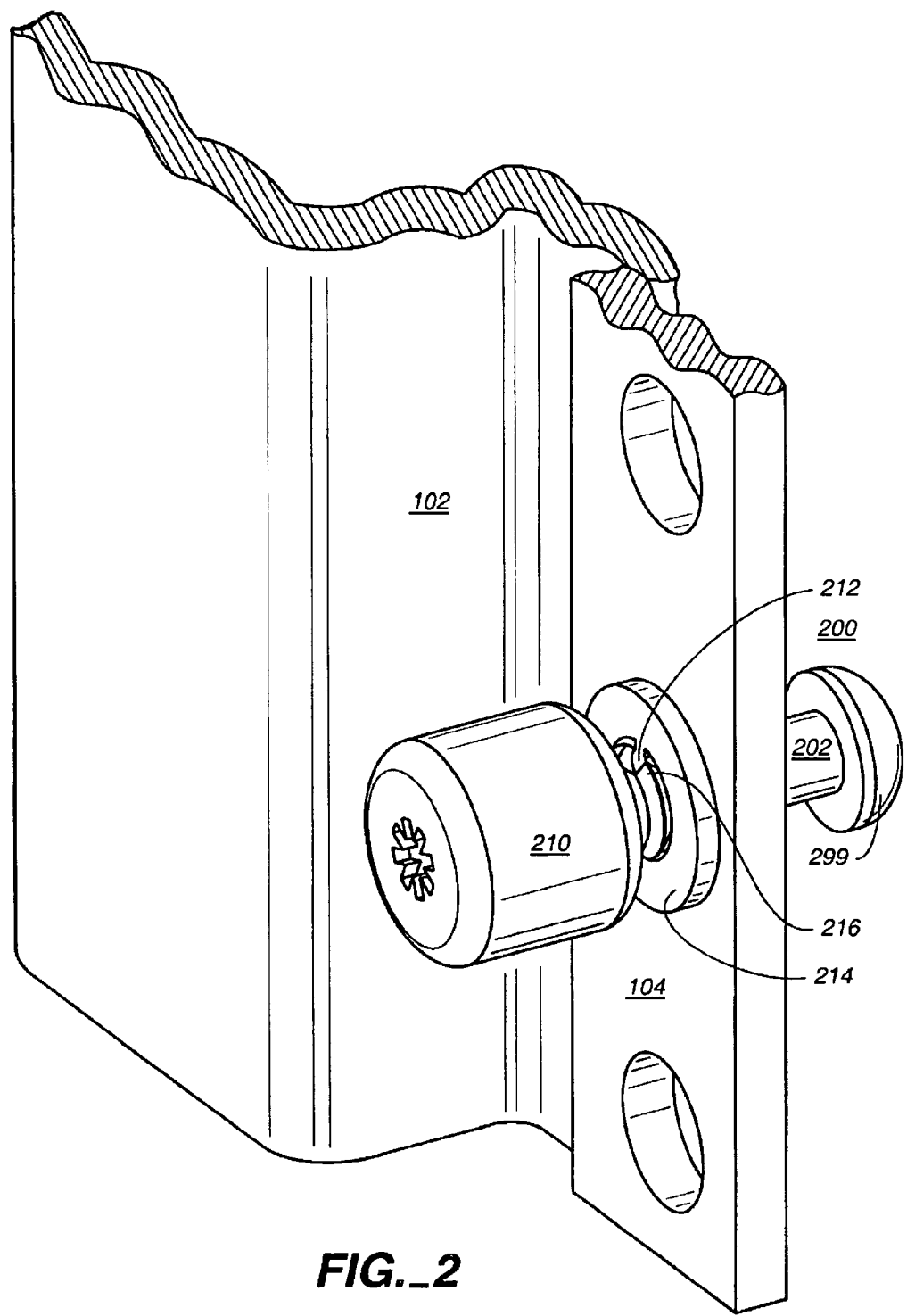
FIG._2

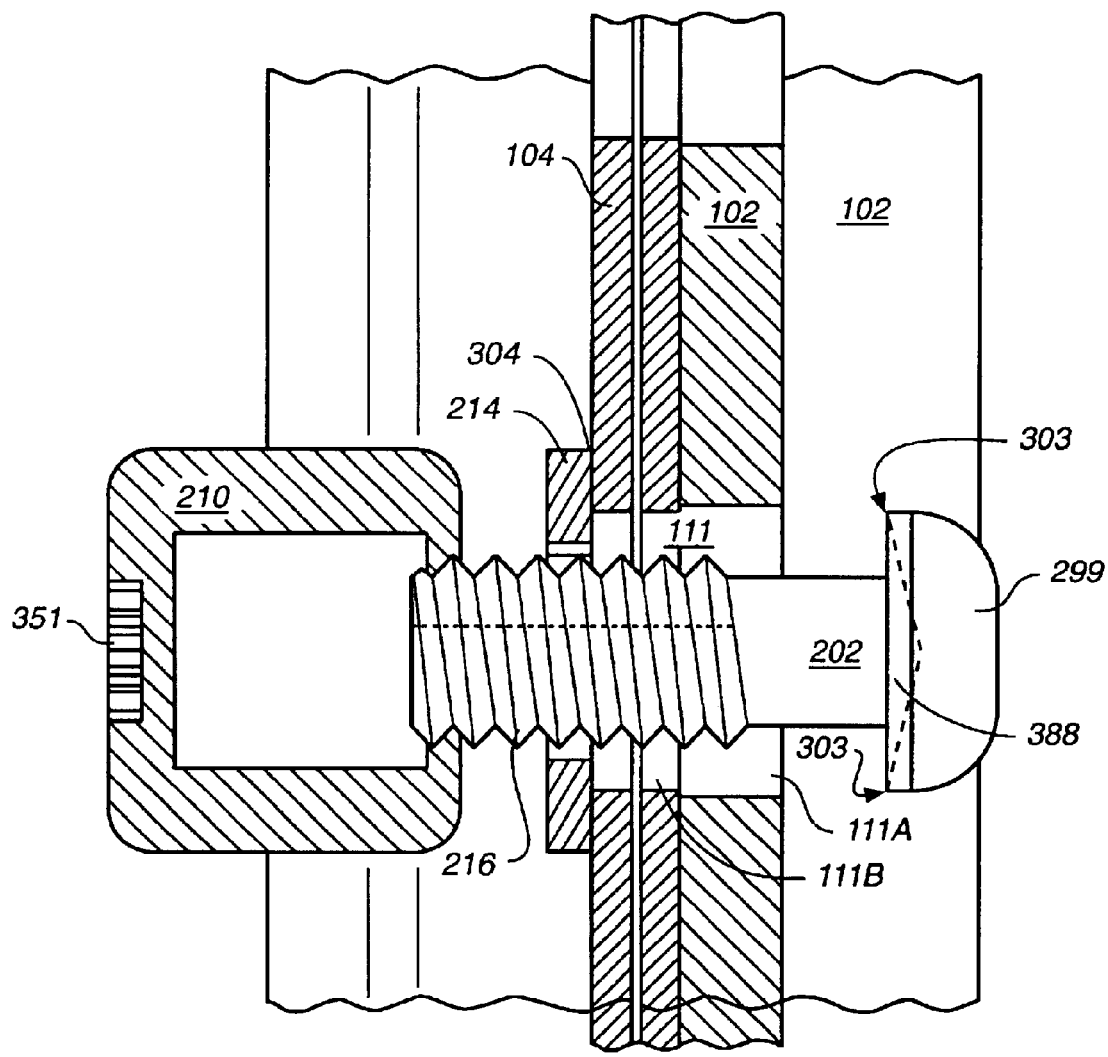
FIG._3

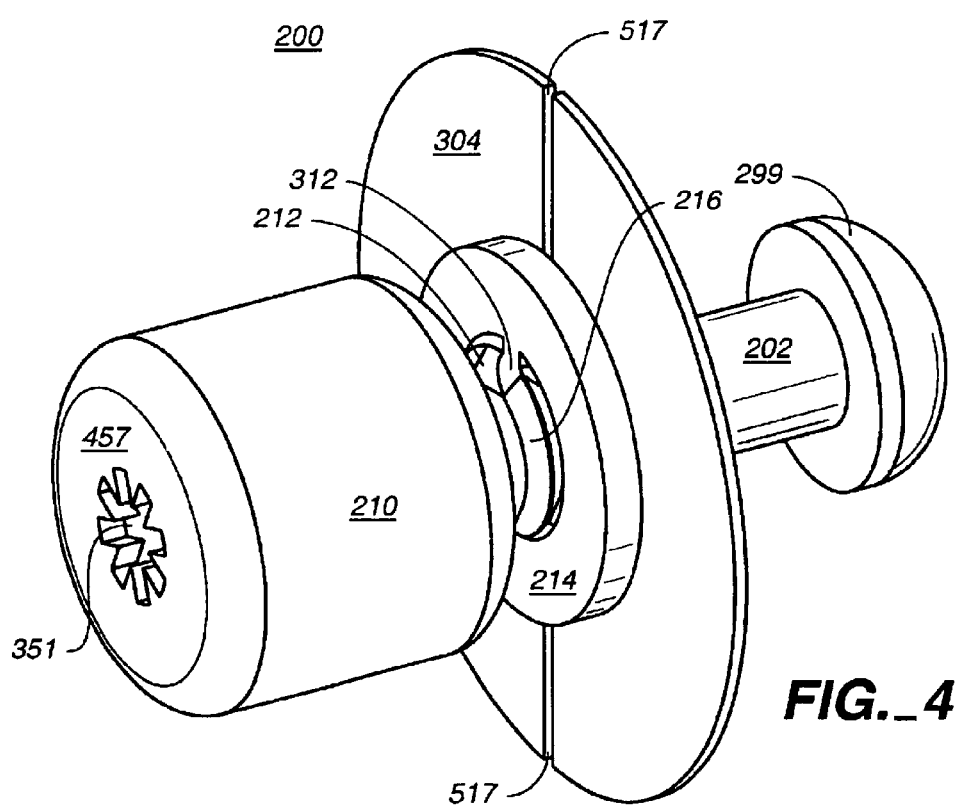
FIG._4

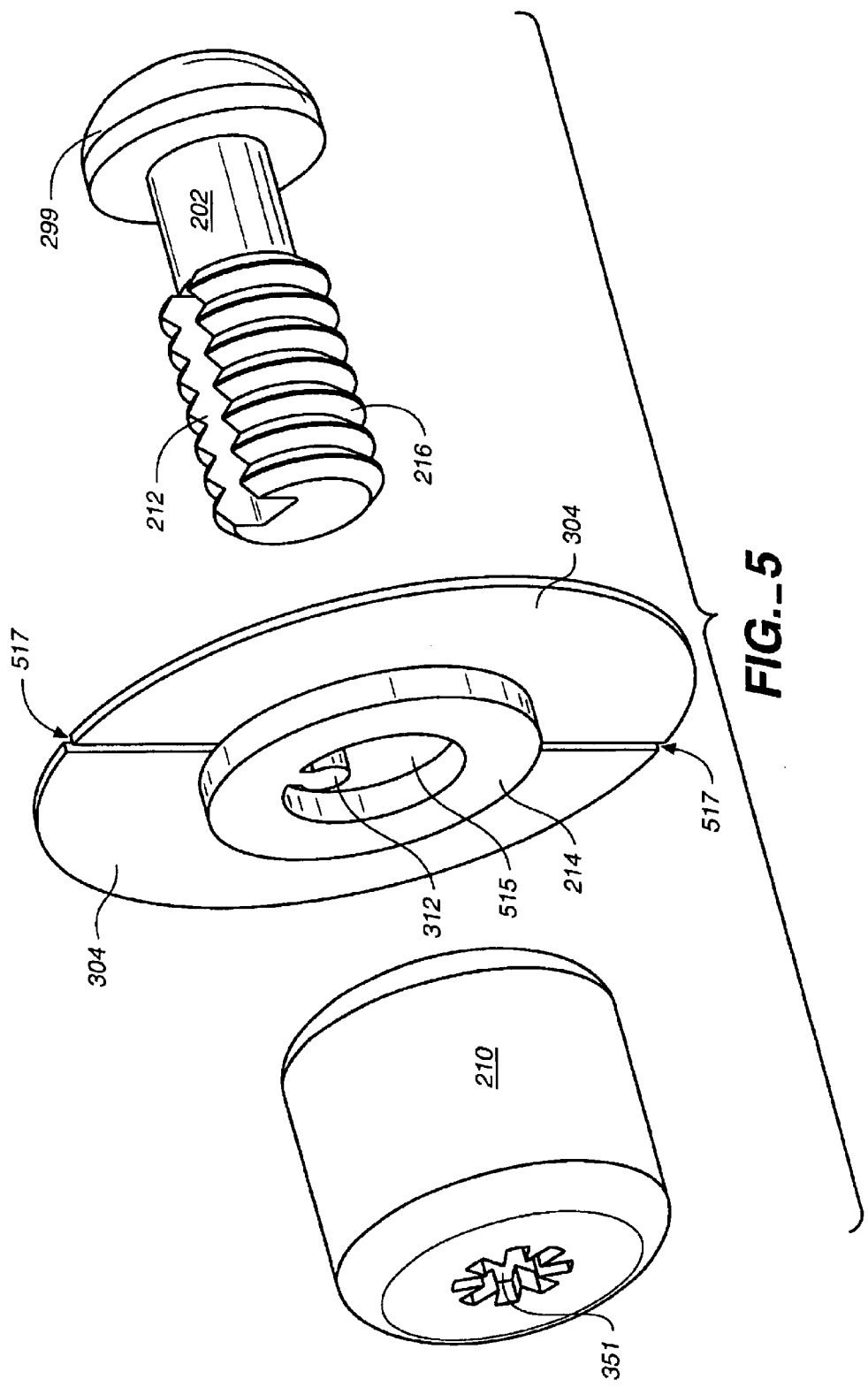
FIG._5

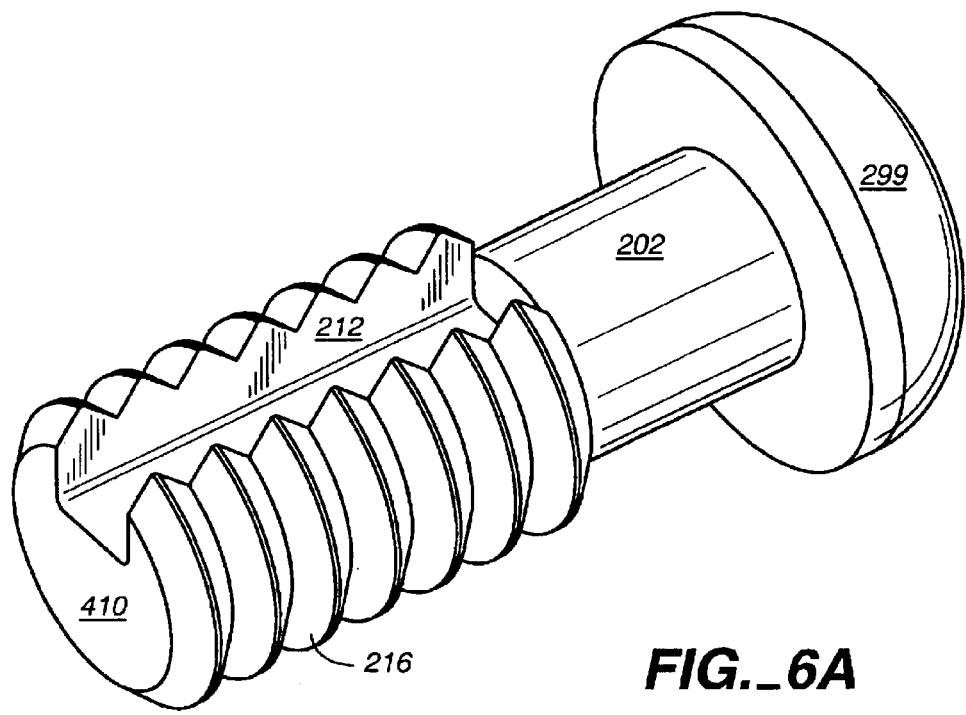
FIG._6A
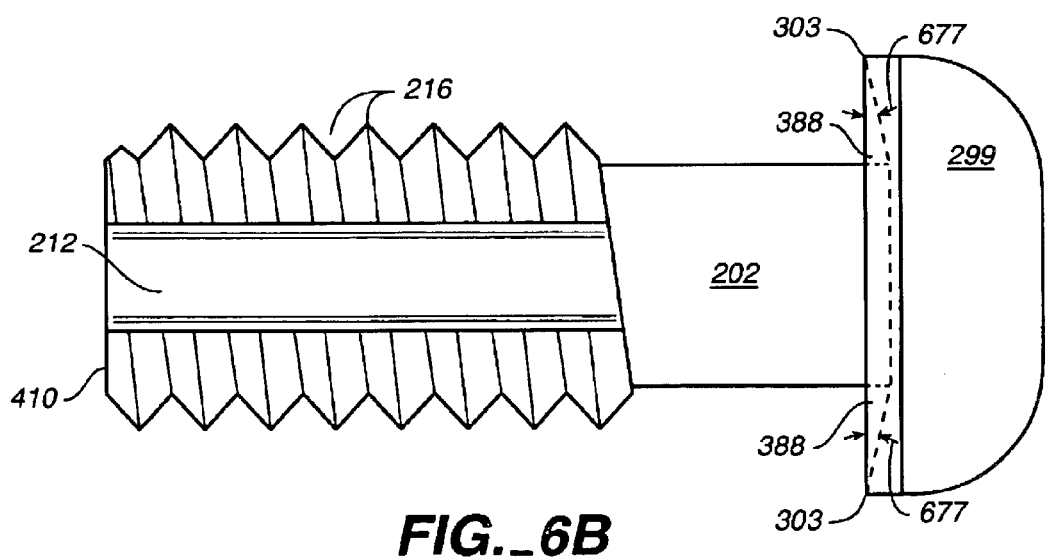
FIG._6B

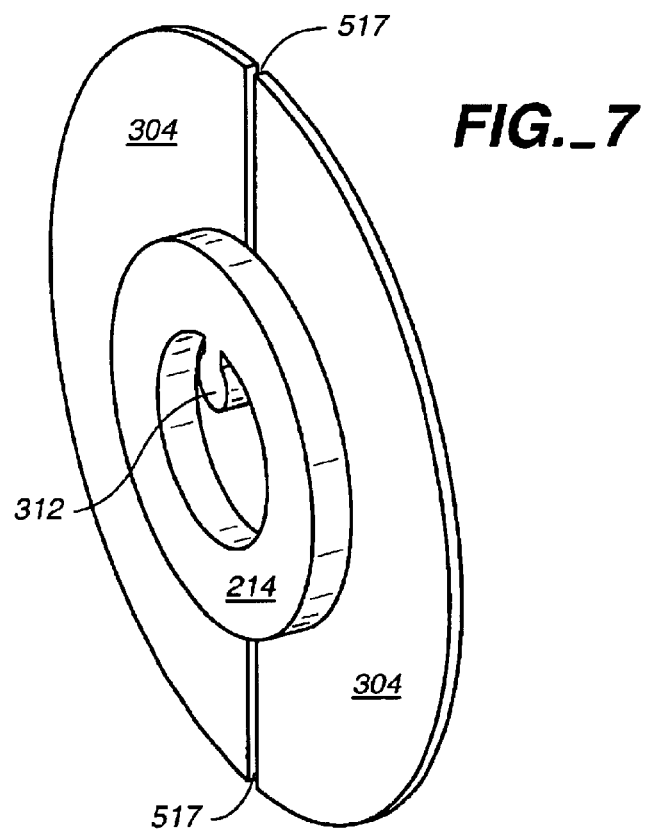
FIG._7
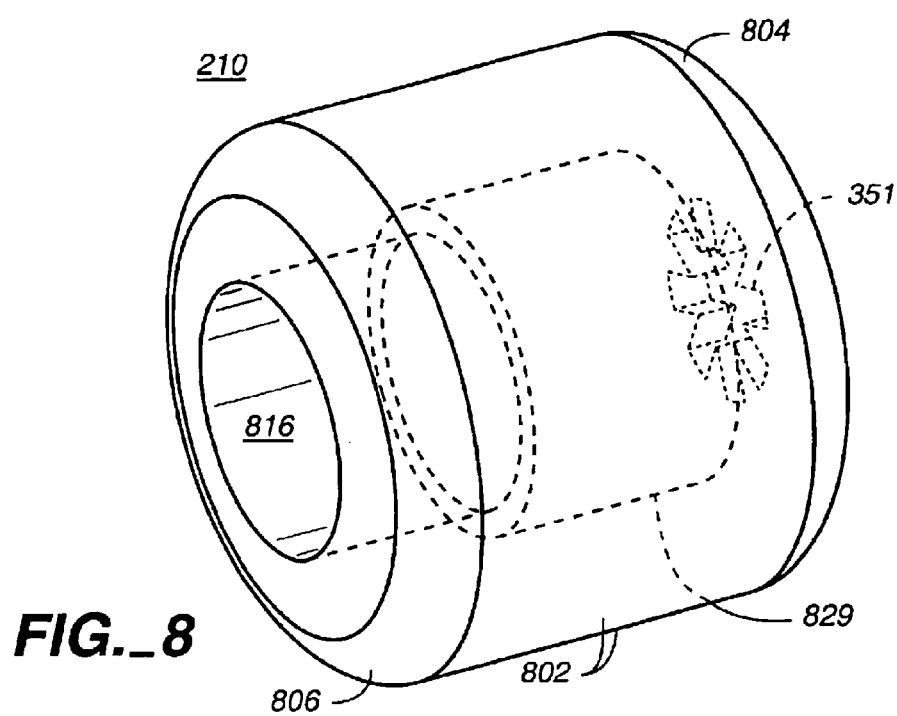
FIG._8

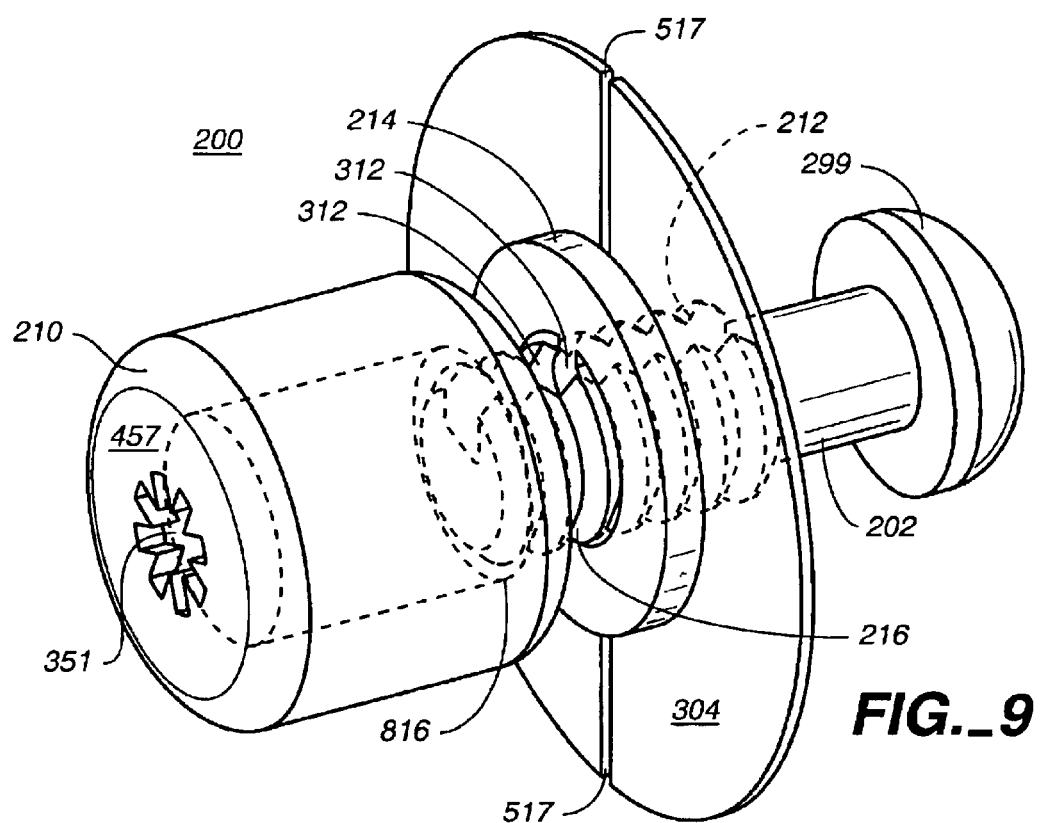
FIG._9

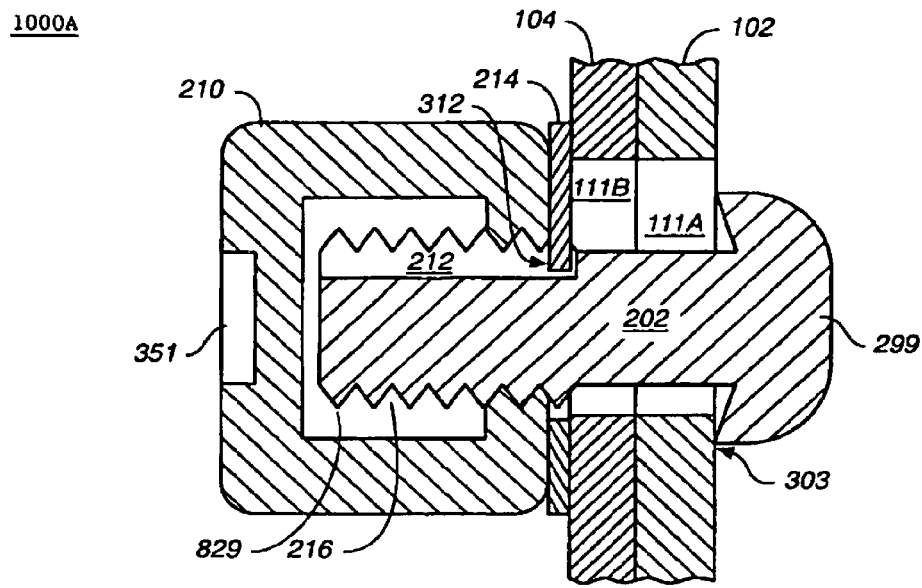
FIG._10A
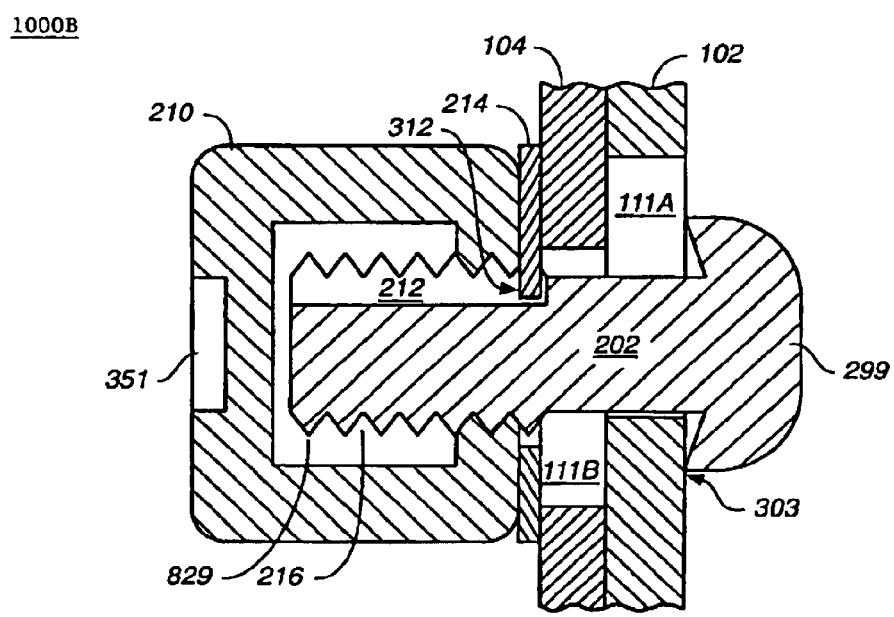
FIG._10B

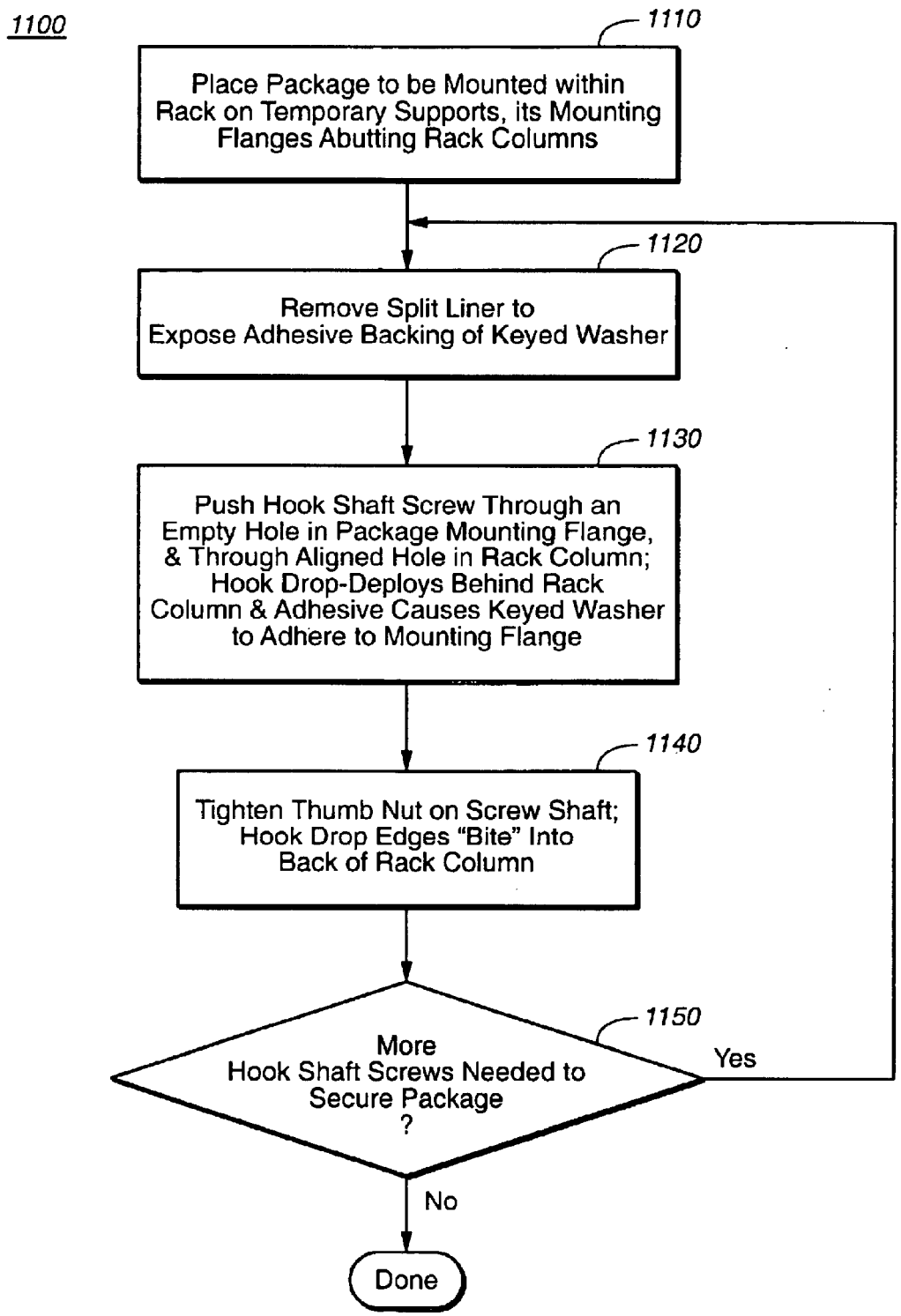
FIG._11

HOOKED SHAFT FASTENING DEVICE

TECHNICAL FIELD

Embodiments of the present invention relate to the field of fasteners. Specifically, embodiments of the present invention relate to a hooked shaft fastening device.

BACKGROUND OF THE INVENTION

Electronic and instrumentation equipment is often deployed in chassis-mounted packages. Illustratively, servers, data storage units, and network components, to name some such electronic equipment, are often deployed in this chassis-mounted configuration. Chassis mounting makes centralizing the location of servers, storage units, network components, and other electronic equipment convenient because stationary and semi-stationary racks, cabinets, cubicles, and similar structures exist for housing such electronic equipment.

Conventionally, chassis-mounted electronic packages are installed in racks and similar structures using screws threaded into nuts of various types, including, for example, clip nuts. Clip nuts or other nuts are typically installed on columns and similar support structures within the racks and other structures. One typical rack design has four such columns running vertically. The columns have holes punched into them, through which bolts and other mounting hardware items pass, which are then threaded into the clip nuts or other nuts mounted behind the hole. Electronic packages are typically mounted horizontally, supported via their own flanging on the rack columns by screws penetrating both the flange and the column, threaded to sufficient tightness into the clip nuts or other nuts.

Various designs exist for clip nuts and other nuts. Many nut designs are quite familiar. Typically, a clip-held nut is affixed to the columns by spring tension or similar holding force exerted by a part of the clip. The clip nuts are all installed before an electronic package can be installed. One major task of installation guides for electronic equipment and their rack mounts as well as various product and technical documentation is to inform the installer where the clip nuts need to be located on the four columns of a mounting rack to satisfactorily install the electronic package.

There are some problems that can arise with installing or moving an electronic or similar package within a rack or similar structure using conventional clip nuts. One problem that can occur in such installations is that one or more of the clips are installed incorrectly. Illustratively, the clip nut can be installed in the wrong hole in the rack column, perhaps offset by as little as a single space. With reference to Prior Art FIG. 1, a chassis mounted package is to be mounted through its flange 104 to rack column 102, into which holes 110,111, and 112 have been punched, drilled, etc. A clip screw 106 is affixed over hole 110. A bolt 108 is pushed through hole 109 in flange 104 so as to support the chassis-mounted package. The path 115 of bolt 108 passes through hole 111 for a properly aligned mounting. However, the clip nut is not in the correct position to secure the bolt 108. Thus, it is misaligned.

Such a problem can occur with troubling frequency, even with trained, experienced users. It is easy to see why—one common rack design has 1,968 holes punched into its columns for mounting packages therein, each hole approximately one inch from the next. This particular problem can be frustrating for users. When it occurs, the electronic package must be removed, the clip nut must be repositioned, and the package reinstalled and its mounting screws tightened, hopefully each now in a correctly positioned clip nut.

To remove clip nuts for repositioning, other problems can arise. When clip nuts must be repositioned, a tool and some amount of force must be brought to bear. Sometimes, the clip nut may fall within the rack or other enclosure. Upon falling, they can encounter electrical connections and cause an electrical fault such as a short or ground. Also upon falling, they can damage equipment such as ventilating fan blades, exposed delicate components in packages mounted beneath them, and/or other items. Further, upon falling a clip nut can become lost on the floor of the rack or other enclosure, which may be cluttered with cables, conductor bundles, and the like. Further still, clip nuts have somewhat sharp edges that can cause injury to a user attempting to remove and/or reposition a balky one.

Clip nuts themselves have costs associated with their procurement, such that losing them is wasteful. Over and above the cost of losing and replacing clip nuts however are other associated costs, such as users' labor costs and costs of delays associated with their repositioning and/or replacement efforts, costs associated with damage caused by their fall, and the human, temporal, and monetary costs associated with injuries caused thereby.

Conventionally, possible problems with using clip nuts for mounting electronic and other packages in racks and other enclosures have been addressed in several ways. First, newer clip nuts have been designed to improve their ease of use. However, even such improved clip nuts are subject to initial and subsequent mis-positioning, dropping, and loss. A second conventional solution has been to thread, rather than punch, each and every one of the plethora of holes in the columns of the racks or other enclosures, such that bolts and other mounting hardware items can be secured directly into the threaded holes. However, this is expensive. A third conventional alternative is to use only enclosures such as two-post racks, which often come with pre-threaded holes in their support columns. However, this precludes selecting other racks, which may be preferable (or even required) in a specific application. Hence, conventional approaches to mounting electronic and similar packages in racks and other enclosures are found somewhat wanting.

SUMMARY OF THE INVENTION

A fastening device is disclosed. The fastening device has a slotted shaft, a hooking mechanism coupled to the shaft and adapted to couple the shaft to a supporting structure. The hooking mechanism deploys to an operational position from the end of the slotted shaft and is adapted to couple the slotted shaft to a supporting structure. An tightening mechanism is adapted to couple to the shaft. The tightening mechanism binds the fastening device securely in place.

BRIEF DESCRIPTION OF THE DRAWINGS

Prior Art FIG. 1 depicts conventional clip nut mounting, illustrating a common misalignment problem.

FIG. 2 depicts a hook shaft rack screw assembly in situ, according to one embodiment of the present invention.

FIG. 3 is an cut away view of the hook screw assembly in situ, according to one embodiment of the present invention.

FIG. 4 depicts an assembled hook shaft rack screw assembly, according to one embodiment of the present invention.

FIG. 5 depicts an exploded view of hook shaft rack screw assembly, in accordance with an embodiment of the present invention.

FIG. 6A depicts, from a first perspective, a hook shaft according to an embodiment of the present invention.

FIG. 6B depicts, from a second perspective, a hook shaft according to an embodiment of the present invention.

FIG. 7 depicts a keyed washer and an adhesive liner according to an embodiment of the present invention.

FIG. 8 depicts a thumb nut according to one embodiment of the present invention.

FIG. 9 is a cutaway view of a hook shaft rack screw assembly, according to one embodiment of the present invention.

FIGS. 10A and 10B depict views of alternative tightened hook shaft rack screw assembly in situ deployments, according to an embodiment of the present invention.

FIG. 11 is a flowchart of the steps in a process for mounting an electronic chassis in a rack using a hook shaft rack screw, in accordance with one embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. In other instances, well known methods, procedures, and components have not been described in detail so as not to unnecessarily obscure aspects of the present invention. A hook shaft fastening device is described herein.

Therefore, the need for conventional fasteners can be dispensed with for mounting electronic and similar packages in racks and other enclosures. Embodiments of the present invention allow fasteners to quickly and safely mount packages in enclosures without the possible alignment problems that can occur with conventional mounting fasteners.

In one embodiment, the fastening device has a slotted shaft, a hooking mechanism coupled to the shaft and adapted to couple the shaft to a supporting structure. The hooking mechanism deploys to an operational position from the end of the slotted shaft and is adapted to couple the slotted shaft to a supporting structure. A mechanism for affixing is adapted to couple to the shaft. The affixing mechanism binds the fastening device securely in place by drawing an edge of the hook, which in one embodiment is mushroom-shaped, into very tight contact, e.g. "biting" into a surface of the support structure, such as a support column in a rack. This biting is promoted by the weight of the package being mounted; thus advantageously, the weight of the package being mounted helps the fastener secure it.

In one embodiment, a hook shaft fastening device such as a hook shaft rack screw can be applied to fastening and/or securing electronic and other packages via their mounting flanges in a rack or other enclosure. However, the present embodiment is not limited to use with electronic packages but rather can be applied to a large number of fastening applications. It is appreciated that an embodiment of the present invention can be applied to fastening other and different kinds of flange-supported chassis in a variety of column bearing enclosures.

Certain portions of the detailed descriptions of embodiments of the invention, which follow, are presented in terms of processes and methods (e.g., process 1100 of FIG. 11). Although specific steps are disclosed herein describing the operations of these processes and methods, such steps are exemplary. That is, embodiments of the present invention are well suited to performing various other steps or variations of the steps recited in the flowchart of the figure herein.

With reference to FIG. 2, a fully assembled hook shaft rack screw device 200 is depicted from an in situ perspective. Hook shaft screw device 200 is deployed to mount a chassis-mounted electronic or similar package (not shown) via its mounting flange 104 to a rack column 102 or a similar structure, according to one embodiment of the present invention. A threaded screw shaft 202, into which a key slot 212 is cut, penetrates both mounting flange 104 and rack column 102. A hook or mushroom cap-shaped leader head hook 299, secures mounting flange 104 to rack column 102 from the rear, essentially by "biting" into column 102 from the back. It is appreciated that in some embodiments, shapes other than hooks or mushroom heads can operate as hooking mechanisms. A thumb nut 210, threaded to complementarily match the threading 216 of screw shaft 202, tightens the hook screw device 200 from the front. A keyed, adhesive-backed washer 214 prevents rotation of hooked screw shaft 202 during tightening.

Referring now to FIG. 3, an cut away in situ view of the hook shaft rack screw device 200 is depicted. A hole 111 penetrates both mounting flange 104 and rack column 102. Hole 111 is comprised of a hole 111A in mounting flange 104 aligned with a hole 111B in support column 102. Hook screw shaft 202, into which key slot 212 is cut, is designed to penetrate hole 111. As screw shaft 202 is pushed completely through hole 111, its hook or mushroom shaped leader head hook 299 clears the back surface of support column 102. As weight is placed on hook shaft rack screw device 200, that weight misaligns the holes 111A in the package's mounting flange 104 and the holes 111B in the support column 102, even if slightly. This misalignment cause the contacting edge 303 in the hook 299 to "bite" into the back surface of the support column 102 as thumbnut 210 is tightened.

Alternatively, as the shaft 202 is inserted, shaft 202 is misaligned with holes 111A and 111B and "drops" into the hole under its own weight, such that when the weight of the package being mounted is applied, the contacting edge 303 in the hook 299 "bites" into the back surface of the support column 102 as thumbnut 210 is tightened.

As thumb nut 210 is tightened onto threads 216, the contacting edge 303 essentially "bites" into the rear surface of column 102, thus securing the package. In one embodiment, a keyed, adhesive backed washer 214 prevents hooked screw shaft 202 from turning as thumb nut 210 is tightened, maintaining the bite of hook or mushroom shaped leader head hook 299 on column 102.

In one embodiment, hook shaped leader head 299 conforms in shape to a slot shaped single lobed hook. As this hook 299 of the present embodiment clears hole 111B, the hook 299 drops down to a hanging position under its own weight. Column holes in many racks and similar enclosures are frequently 7 mm in diameter. In the present embodiment, hook screw shaft 202 is 5 mm in outer diameter and hook 299 has a 2 mm overhang and a 5 degree angle of return (e.g., bevel) 388. Advantageously, the 5 degree bite prevents unwanted, potentially unsafe release of the package attached to mounting flange 104 if the package front is lifted. Mushroom head and other shaped leader head 299 embodiments operate to secure their packages similarly.

FIG. 4 depicts a view of an assembled hook shaft rack screw device 200 standing alone, viewed from the front end 457 of screw shaft 202, opposite from the mushroom cap-shaped leader head hook 299 end. A recess 351 in the outer end of thumb nut 210 can be added in some embodiments to allow thumb nut 210 to be tightened by a screw driver, torx driver, or the like. Keyed washer 214 is positioned part way down the threading 216 with its key 312 positioned within key slot 212. Adhesive liner 304 adheres to the adhesive backing of keyed washer 214 to protect the adhesive surface prior to deployment of device 200; it is to be removed by a user prior to installation to expose the adhesive. Adhesive-backed keyed washer 214 adheres to flange 104 to function as a detent mechanism. Adhesive-backed keyed washer thus deters rotation of the shaft 202 as a thumb nut is tightened.

FIG. 5 is an exploded view of a hook shaft rack screw fastener according to one embodiment of the present invention. Hook shaft 202 has a slot 212 cut partially through it along the part of its longitudinal axis surrounded by threading 216. In one embodiment, slot 212 is disposed to receive a key, such as key 312 on adhesive-backed keyed washer 214.

In the present embodiment, slotted hook shaft 202 has a mushroom cap-shaped leader head hook 299 to bite into the back surface of a part of a rack support column (e.g., column 102; FIG. 2). Hook shaft 202 fits through a hole 515 in adhesive-backed keyed washer 214 and adhesive liner 304 such that key 312 engages slot 212 in hook shaft 202. Upon removing adhesive liner 304, allowing adhesive-backed washer 214 to adhere to a mounting flange and key 312 to engage keyed slot 212, shaft 202 is deterred from turning as thumb nut 210 is tightened. Thumb nut 210 can be tightened by a driver tool, such as a screw driver, torx driver, or the like via a recess 351 in the outer end of thumb nut 210, added in some embodiments.

FIG. 6A depicts a hook rack screw alone from a first perspective. The flattened end 410 of the hook shaft 202 protrudes towards the front of the rack or other enclosure to receive a thumb nut (e.g., thumb nut 210; FIGS. 2, 3, 4, 8) or similar tightening or affixing component. At the opposite end of hook shaft 202 is a hook, in one embodiment a mushroom cap-shaped leader head hook 299. With reference to FIG. 6B, hook shaft 202 is viewed from a second perspective, looking directly down into key slot 212. A recess 388 is cut into mushroom cap-shaped leader head hook 299 to provide a biting edge 303. The angle of return 677 is acute. In one embodiment, a hook replaces a mushroom cap-shaped leader head hook 299. Angle of return 677 in the hook embodiment is approximately five degrees. In one such embodiment, angle of return 677 can range from three to 15 degrees.

FIG. 7 depicts keyed washer 214 and adhesive liner 304 by themselves. Key 312 protrudes from keyed washer 214 into an inside hole 501 thereof. Adhesive liner 304 adheres to an adhesive-coated side of keyed washer 214 until the liner is removed at the time of installation of the fastener device. A slit 517 is cut in the adhesive exposure preventive material to effectuate peeling the material off the adhesive at the time of use. In one embodiment, liner 304 is oversized with respect to the keyed washer 214. Slit 517 and oversizing liner 304 with respect to keyed washer 214 advantageously facilitate ease of removal by users. Oversizing also reminds users to remove the liner 304 during installation of the fastener.

Liner 304 can be glassine or similarly smoothed paper, cellulose, plastic-backed paper, plastic, or similar material. Liner 304 protects the cleanliness and stickiness of the adhesive backing on keyed washer 214 until it is ready for installation deployment. Adhesive-backed keyed washer 214 functions as a detent deter rotation of the shaft 202 as thumb nut 210 is tightened.

FIG. 8 depicts thumb nut 210 by itself. The longitudinal circumference 802 of thumb nut 210 can be knurled. Beveled surfaces 804 and 806 can, in some embodiments, taper from the longitudinal circumference down to flattened outer and inner ends respectively. A recess 351 in the outer end of thumb nut 210 can be added in some embodiments to allow thumb nut 210 to be tightened by a screw driver, torx driver, or the like. A recess 816 on the inner end of thumb nut 210 is threaded complementarily to the threading 216 on the end of the screw shaft 202 (FIG. 2, 3, 4). Thumb nut 210 may, in some embodiments, have a hollow recess 829 within.

FIG. 9 depicts a cut way view of an assembled hook shaft rack fastener 200 standing alone, according to an embodiment of the present invention. Here, hook shaft fastener 200 is viewed from the front end 457 of thumb nut 210 having a recess 351, opposite from the mushroom cap-shaped leader head hook 299 end. Keyed washer 214 is positioned part way down the threading 216 with its key 312 positioned within key slot 212. Adhesive liner 304 is shown in situ, prior to removal, protecting the adhesive coating which adheres to keyed washer 214.

FIGS. 10A and 10B depict views of alternative tightened hook shaft rack screw assembly in situ deployments 1000A and 1000B, respectively, according to an embodiment of the present invention. In FIG. 10A, a hook shaft screw 1000A has dropped in through hole 111B in package mounting flange 104 and hole 111A in support column 102 under the force of its own weight. Key 312 is locked into position within keyed slot 212, such that rotation of shaft 202 was deterred as thumb nut 210 was tightened. Contacting edge 303 is shown biting into the rear surface of column 102, so as to secure hook shaft screw 1000A and the package being mounted.

In FIG. 10B, a hook shaft screw 1000B is shown securing a package, the mounting flange 104 of which has dropped after hook shaft screw 1000B has been installed. Mounting flange 104 and its hole 111B are seen to be out of line relative to support column 102 and its hole 111A. Key 312 is locked into position within keyed slot 212, such that rotation of shaft 202 was deterred as thumb nut 210 was tightened. Contacting edge 303 is shown biting into the rear surface of column 102, so as to secure hook shaft screw 1000A and the package being mounted. It is appreciated that FIGS. 10A and 10B both depict alternative deployments of hook shaft screws by which packages can be mounted securely.

One embodiment of the present invention provides a method of fastening a package having a mounting flange penetrated by a hole in an enclosure having a support structure penetrated by a hole. The package is placed inside the enclosure such that its mounting flange abuts the support structure and such that the hole in the mounting flange is aligned with the hole in the support structure. The support structure can be, for instance, a support column in a rack or other enclosure for electronic or similar equipment. Each hole is penetrated with a fastener shaft such that the hook or mushroom-shaped leader of the shaft deploys to an operational position, such as by dropping down and/or "biting" upon clearing the rear-most hole (e.g., the hole 111A in the support column; FIG. 3). Further rotation of the shaft can be deterred as a tightening mechanism is affixed, such that the tightening mechanism draws the biting edge of the hook (or mushroom-shaped) leader into contact with the support structure, thus securing the package within the enclosure. An exemplary implementation of this method is described by reference to FIG. 11.

FIG. 11 is a flowchart describing a process 1100 for assembling a hook shaft fastener device (e.g., hook shaft rack screw device 200; FIGS. 2, 3, 4, 9) and deploying the device to secure a chassis-mounted electronic or other package within a rack or similar enclosure.

Process 1100 begins with step 1110, wherein a package to be mounted, such as a server, data storage unit, networking switch, or another electronic or other device is placed within a rack or other enclosure. The package can be placed on temporary supports, such as pins protruding from the rack columns. The package is placed so that its mounting flanges abut the rack columns.

In step 1120, an adhesive liner (e.g., split liner 304) adhering to an adhesive backing on a keyed washer (e.g., keyed washer 214; FIGS. 2, 3) is removed to expose the adhesive backing on the keyed washer, such as by peeling off a glassine or other coating.

In step 1130, a hook shaft rack screw device is pushed, hook (or mushroom-shaped) leader first, through an empty hole in the package's mounting flange. It is also pushed through an aligned hole in the rack column. Advantageously, the hook shaft rack screw device can be used to align the holes in the package mounting flange with the holes in the rack column. The washer, its hole surrounding the screw shaft, is placed into contact with the package's mounting flange such that it adheres thereto about the screw shaft. In an embodiment having a hook-shaped leader, upon the hook shaped leader of the screw shaft clearing the column rack hole, its hook drops down (e.g., drop deploys) into a downward facing operational position behind the rack column under its own weight.

In either embodiment, the hook or mushroom-shaped leader operates as a hooking functionality when deployed to an operational position (e.g., upon clearing the hole in the support structure) to secure the fastener upon tightening a tightening mechanism, such as a thumb nut (e.g., thumb nut 210, FIGS. 2, 3). Upon tightening, the tightening mechanism draws the shaft (e.g., shaft 202; FIGS. 2, 3) towards it, such that its drop edges "bite" into (e.g., draws an edge of a beveled part of the hooking functionality into tight contact with) the support structure.

In step 1140, the thumb nut is tightened on the screw shaft. In one embodiment, the thumb nut can be tightened with a driver tool, such as a screw driver, a torx driver, or a similar tool via a recess (e.g., recess 351; FIGS. 3, 4, 5) installed therein. In one embodiment, the thumb nut can be torqued to a specified torque requirement. As the thumb nut is tightened, and/or as the weight of the package being mounted exerts a downward force on the hook shaft fastener device, the hook (or mushroom-shaped) leader "bites" into the back surface of the support column, securing the package at that point.

In step 1150, it is decided whether additional hook shaft screw devices are needed to properly install the package and secure it in place within the rack or other enclosure. If it is decided that additional hook shaft screw devices are needed to secure the package, then process 1100 loops back to step 1120 and repeats. Upon deciding that no additional hook shaft screw devices are needed to secure the package, process 1100 is complete.

In one embodiment, a hook shaft rack screw can be applied to fastening and/or securing electronic and other packages via their mounting flanges in a rack or other enclosure. However, the present embodiment is not limited to use with electronic packages but rather can be applied to a large number of fastening applications. It is appreciated that an embodiment of the present invention can be applied to fastening other and different kinds of flange-supported chassis in a variety of rack bearing enclosures. For instance, packages to be mounted using hook shaft fasteners according to embodiments of the present invention can include illustratively, but are not limited to, various chassis-mounted electronics, other electronic packages, servers, network equipment, data storage equipment, instrumentation packages, and computer components. Enclosures in which such packages can be mounted using hook shaft fasteners according to embodiments of the present invention can include illustratively, but are not limited to, racks, cabinets, cubicles, instrumentation containers, electrical switchgear, and computer frames.

In summary, a hook shaft fastening device is disclosed. In one embodiment, the fastening device has a slotted shaft, a hooking mechanism coupled to the shaft and adapted to couple the shaft to a supporting structure. The hooking mechanism deploys to an operational position from the end of the slotted shaft and is adapted to couple the slotted shaft to a supporting structure. A tightening mechanism is adapted to couple to the shaft. The tightening mechanism binds the fastening device securely in place by drawing an edge of the hook, which in one embodiment is mushroom-shaped, into very tight contact, e.g. "biting" into a surface of the support structure, such as a support column in a rack. This biting is promoted by the weight of the package being mounted; thus advantageously, the weight of the package being mounted helps the fastener secure it.

An embodiment of the present invention, a hook shaft fastening device, is thus described. While the present invention has been described in particular embodiments, it should be appreciated that the present invention should not be construed as limited by such embodiments, but rather construed according to the following claims and their equivalents.

What is claimed is:

1. A fastening device comprising:

a slotted shaft having a hooking mechanism adapted to couple said shaft to a supporting structure, wherein said hooking mechanism deploys to an operational position from an end of said slotted shaft, a threaded part at an end opposite from said hooking mechanism and running cylindrically parallel to the longitudinal axis of said slotted shaft toward said hooking mechanism, and a slot cut through said longitudinal axis of said slotted shaft wherein said slot penetrates said threaded part parallel to said longitudinal axis; and a tightening mechanism adapted to couple to said shaft, wherein said tightening mechanism binds said fastening device securely in place, wherein said hooking mechanism comprises a bevel having an edge wherein said edge functions to bite into the surface of a part of said support structure.

2. The fastening device as recited in claim 1, wherein said hooking mechanism comprises a shape selected from the group consisting of a hook shape and a mushroom-cap shape.

3. The fastening device as recited in claim 1, further comprising;
   a keyed washer; and
   an adhesive backing for said keyed washer wherein said adhesive backing affixes said keyed washer in an originally installed position and wherein said keyed washer and said adhesive backing function to deter rotation of said slotted shaft during tightening of said tightening mechanism.

4. The fastening device as recited in claim 1, wherein said affixing mechanism comprises a nut threaded complementarily with said threaded part.

5. The fastening device as recited in claim 4, wherein said nut comprises a thumb nut.

6. The fastening device as recited in claim 5, wherein said thumb nut is adapted to be tightened by a tool.

7. A device for fastening a package having a mounting flange penetrated by a hole in an enclosure having a support structure penetrated by a hole comprising:
   a shaft having a slot cut parallel to its longitudinal axis wherein a part of said slot completely penetrates a threaded part of the length of said shaft disposed about one end of said shaft;
   a hooking mechanism coupled to said shaft wherein said hooking mechanism is at an end of said shaft opposite from said end of said shaft about which said threaded part is disposed;
   a tightening mechanism adapted to couple to said shaft wherein said mechanism binds said fastening device securely in place; and
   a detent mechanism disposed about said shaft for deterring rotation of said device.

8. The fastening device as recited in claim 7 wherein said hooking mechanism comprises a shape selected from the group consisting of a hook shape and a mushroom-cap shape, wherein said hooking mechanism comprises a bevel having an edge wherein said edge functions to bite into the surface of a part of said support structure, and wherein said hooking mechanism deploys to an operational position upon clearing said hole in said support structure.

9. The fastening device as recited in claim 7 wherein said tightening mechanism comprises a nut threaded complementarily with said threaded part.

10. The fastening device as recited in claim 9, wherein said nut comprises a thumb nut.

11. The fastening device as recited in claim 10, wherein said thumb nut is adapted to be tightened by a tool.

12. The fastening device as recited in claim 9 wherein said detent mechanism comprises:
    a keyed washer; and
    an adhesive backing for said keyed washer wherein said adhesive backing affixes said keyed washer in an originally installed position and wherein said keyed washer and said adhesive backing function to deter rotation of said slotted shaft during installation of said tightening mechanism.

* * * * *